April 1, 1969 P. P. BIRINGER 3,436,641

SOLID STATE STATIC FREQUENCY MULTIPLIERS

Filed Jan. 10, 1966

INVENTOR.
Paul Peter Biringer
BY J. H. Slough
Attorney

INVENTOR.
Paul Peter Biringer
BY
[signature]
Attorney

INVENTOR.
Paul Peter Biringer
BY
attorney

United States Patent Office 3,436,641

Patented Apr. 1, 1969

3,436,641

SOLID STATE STATIC FREQUENCY MULTIPLIERS

Paul Peter Biringer, Toronto, Ontario, Canada, assignor to Ajax Magnethermic Corporation, Youngstown, Ohio, a corporation of Ohio Filed Jan. 10, 1966, Ser. No. 519,601
Int. Cl. H02m 5/06, 5/30; H03k 17/66
U.S. Cl. 321—7 15 Claims

ABSTRACT OF THE DISCLOSURE

A static frequency multiplier and phase converter utilizing solid state switching elements, operation of the switching elements being independent of both the supply voltage and loading conditions. The output power may be easily controlled from zero to maximum without the use of moving parts such as tap changers.

This invention relates to electric phase balancers and relates more particularly to a static device for distributing the output of any number of phases symmetrically over any number of supply phases.

This invention is particularly adapted to static frequency multipliers and relates more particularly to improvements in multipliers for providing single phase higher frequency output from a multiphase source of lower frequency. The multipliers of this invention may specifically be employed for induction heating or the like.

In prior multipliers of the prior art the input power factor is inherently low and as the cores are operating in a highly saturated state, linear reactors and capacitors have been suggested to correct the inherently low power factor to close to unity, as in Biringer U.S. Letters Patent No. 2,040,230 dated June 19, 1962. In such systems, the instant of switching between the unsaturated and saturated state of the transformer core is dependent on the supply voltage and on the loading conditions.

In the present invention, by using solid state switching devices to perform the switching action, the instant of firing is made independent of both the supply voltage and of loading conditions. In addition, such multiplier requires less compensation on the input side to achieve close to unity power factors. Further, since the firing angle can be controlled in such multiplier, a more versatile operation results with higher efficiency and with reduction of capacitance.

By using solid state switching elements, as for example, silicon controlled rectifiers, in the novel circuit of this invention, the output power may easily be controlled either automatically or manually by phase shifting the firing pulses of the said elements.

It is an object of this invention to achieve balanced loading on each of the phases of the power source without the use of moving parts, such as contactors, tap changers or the like.

It is further on object to provide a static device for balancing any number of phases symmetrically to a supply of any number of phases.

It is a further object of this invention to provide means for controlling the output power between 0 and maximum.

It is a further object of this invention to provide control means for synchronously operating the solid state switching means at desired time intervals and sequence.

It is an object of this invention to statically generate harmonics of the alternating source by using solid state switching elements on the input side.

It is another object of this invention to generate a single phase output from a multiphase source which is symmetrically distributed at the source.

It is a further object of this invention to prevent high current pulses in the supply line while generating harmonics of the source.

It is another object of this invention to provide a frequency multiplier of high efficiency.

It is still another object of this invention to obtain a solid state frequency multiplier reflecting a negligable amount of harmonic currents into the supply line.

It is another object of this invention to provide a frequency multiplier having constant current characteristics on the output side.

Still another object of this invention is to provide a frequency multiplier having constant voltage characteristics on the output side.

Another object of this invention is to provide a frequency multiplier having close to unity power factor on the input side.

It is another object of this invention under certain conditions to eliminate the tripling harmonics from the supply line.

Other objects of this invention and a clearer understanding of the invention itself may be obtained by reference to the following specification and claims in cooperation with the accompanying drawings in which FIGURE 1 is a circuit diagram of a basic circuit for a frequency tripler disclosing a preferred form of my invention, in which a number of solid state switching devices and linear reactors are used according to the invention;

Figure 1:
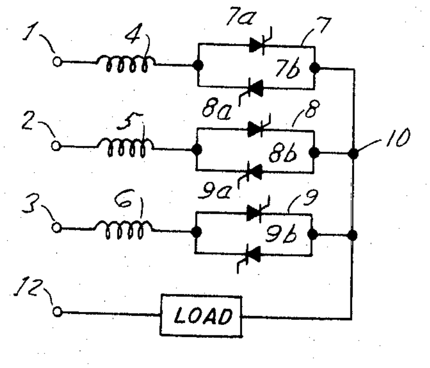
FIGURE 1A is a diagram of the firing sequence of the solid state switching devices of FIGURE 1.
FIGURE 1B is a diagram of a capacitive load circuit, preferably employed in the invention.

Referring now to the drawings, in all of which like parts are designated by like reference characters; in FIGURE 1 the basic circuit of my invention is shown. The terminal point of the 3-phase current supply is shown at 1, 2, and 3; the neutral point of the supply is shown at 12, not grounded. Linear reactors 4, 5, and 6 are connected in between the supply points 1, 2, and 3 and solid state switching devices shown at 7, 8, and 9 are as illustrated consisting of pairs of silicon controlled rectifiers disposed back to back for each line of the three phase input, as shown at 7A, 7B, 8A, 8B, 9A, and 9B.

A terminal point of all the solid state switching devices is connected to a common point 10; and the load, which is preferably a coreless induction furnace having an inherently low power factor, is connected to the said common point 10 and the supply neutral 12.

The linear reactors 4, 5, and 6 are placed in each line of the three phase system to limit the line current when more than one solid state switching device conducts simultaneously. Three modes of operation are possible in the invention disclosed in FIGURE 1; namely, one silicon controlled rectifier may conduct at a given time; two silicon controlled devices, i.e. 7 and 8, or 8 and 9, or 7 and 9, may conduct simultaneously in two lines during part of a cycle; or all three silicon controlled devices may conduct simultaneously in all three lines during part of a cycle.

Figure 2:
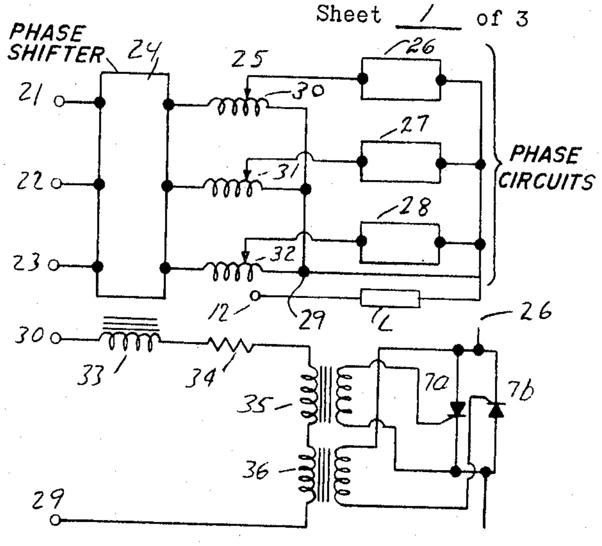
FIGURE 2 is a circuit diagram of a part of the invention, a firing circuit for a solid state switching device being disclosed therewith.

The firing circuit is not illustrated in FIGURE 1, but it is to be understood that a firing circuit as illustrated in FIGURE 2 may be utilized therewith. As shown, firing pulses are supplied to each silicon controlled rectifier so that there is a 120° phase shift between 7A, 8A, and 9A and the same phase shift between 7B, 8B, and 9B. There is a 180° phase shift between 7A and 7B and 8A and 8B and 9A and 9B.

Figure 1A:
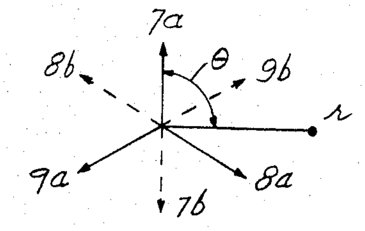

The firing sequence is shown in FIGURE 1A. It is to be noted by reference to the drawings that the relative phase position theta ($\theta$) of the firing pulse with respect to the reference is variable, as explained hereinbelow. Considering the circuit of FIGURE 1:

If the firing angle is such that at any given time only one silicon controlled rectifier conducts, the line current is limited by the lead in series with the line reactor; if the firing angle is such that, during some part of the cycle two silicon controlled rectifiers are conducting simultaneously, as above described, the line current is limited now by two linear line reactors in series, as for example, 4 and 5 or 5 and 6 or 6 and 4, across the line-to-line supply voltage. The triplen harmonic components of the line current are limited now by the three linear reactors in parallel as 4 and 5, 5 and 6, 6 and 4 and by the load; if the firing angle is such that during some part of the cycle three silicon controlled rectifiers are conducting simultaneously, the fundamental, fifth, seventh, etc., harmonic components of the line current are limited by the linear reactor (4 or 5 or 6) across the line to neutral voltage and the triplen harmonic components by the load and by the linear reactors in parallel (4, 5, 6).

Figure 3:
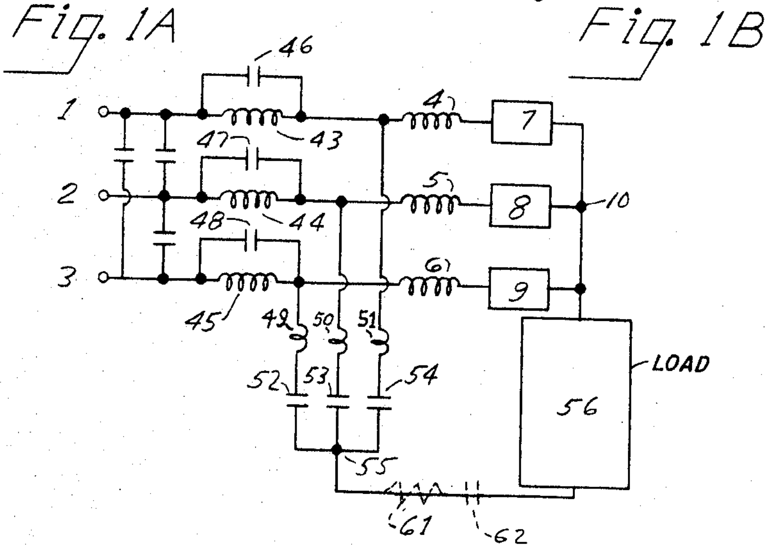
FIGURE 3 is a circuit diagram of a frequency tripler disclosing a form of the invention wherein an artificial neutral point and power factor compensation means are utilized.

It should be obvious in this connection that the line currents will contain a substantial percentage of third, fifth, seventh, etc. harmnoics of the source frequency and the load and the supply neutral will carry only triplen harmonics. One can eliminate the third harmonic component by creating an artificial neutral point 55, as shown in FIGURE 3, and by connecting the load 56 in between the common point 10 of the silicon controlled rectifiers and the artificial neutral 55 created by using three phase star-connected capacitors across the line. The capacitors 52, 53, and 54 now provide a path for the triplen frequency components of the current and at the same time act as a shunt for the other odd numbered frequency components of the line current, including the fundamental.

When this connection is used only fifth, seventh, eleventh, etc. harmonics are present in the line current.

Figure 1B:
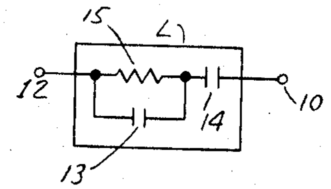

The output power is limited by the linear reactors 4, 5, and 6 unless the load circuit is capacitive, as shown in FIGURE 1B; with such capacitive load circuit, it is possible to obtain by this invention both constant output voltage or constant output current or a combination of these.

Referring to FIGURE 1B, both the series and the parallel capacitors 14 and 13, respectively, are shown with a resistive load 15. In the event that only the capacitor 13 and the resistance 15 is connected in the load circuit and the capacitor 14 is omitted, if the capacitive reactance $X_c$ of the capacitor 13 has the same or substantially the same ohmic value at the third harmonic frequency as the ohmic value of the reactance $X_1$ of any of the linear reactors 4 or 5 or 6 at the supply frequency then the output circuits will behave as a constant current source for the resistive load.

It will be noted that the three linear reactors 4, 5, and 6, in series in a supply line connected between the supply points 1, 2, 3, and the silicon controlled rectifiers 7, 8, and 9, respectively, have each the same ohmic value. Thus a constant current operation is achieved; e.g. $X_c$ (180 c.p.s.) $\cong X_1$ (60 c.p.s.). Constant voltage across the resistive load 15 can be obtained with only the use of capacitor 14 in the circuit and with an ohmic value of e.g. $X_c$ (180 c.p.s.) $\cong X_1$ (60 c.p.s.). It has been found that a highly efficient operation occurs when the firing angle theta ($\theta$) is regulated so that during some part of the cycle two rectifiers are conducting simultaneously; for example, **7*a*, and 8*a*, 8*a* and 9*a***. Also operation in this manner achieves advantageous size of the unit.

It has been found desirable to use separate cores to supply current pulse to each pair of rectifiers to prevent backfiring. The firing circuit shown in FIGURE 2 illustrates one of three identical circuits which can be used to fire each of the three rectifiers shown in FIGURES 1 and 2.

In FIGURE 2 the three phase supply is shown as connected across terminals 21, 22, and 23; and a phase shifting network 24 is employed to obtain any desired value of the firing angle theta ($\theta$). This phase shifting network can be an induction type phase shifter or any other type known in the art which will provide continuous phase shift between the input and output voltages. An autotransformer 30, 31, 32, or any other means, can be used to set the voltage level of the input to the identical pulse circuits 26, 27, 28. The pulse circuit 26, of the phase A is shown in the lower portion of FIGURE 2 in conjunction with the firing circuit diagram. As shown, the pulse circuit 26 is connected between the star point 29 of the autotransformer 25 and its tap 30. It is comprised of a voltage driven square loop core chopper 33 in series with a current limiting resister 34 and in series with two square loop core pulse transformers 35, 36 to supply firing pulses to silicon controlled rectifiers **7*a*, 7*b***, of phase A.

In FIGURE 3, a modification of the invention is shown which utilizes the artificial neutral point 55 as hereinbefore referred to by which tripler harmonic currents are eliminated from the line and provides power factor compensation. The capacitors 52, 53, 54 illustrated in this figure are employed to create the artificial neutral 55; however, it is to be understood that other means may be employed for the purpose and under certain conditions, induction or transformer means are preferably substituted therefor. The load 56, with or without its associated capacitors 13, 14 is, in this form of the invention, connected in between the artificial neutral 55 and the common point 10 of the rectifiers 7, 8, and 9 through commutating inductor 61 and capacitor 62. It should be observed that in this connection the line current contains fundamental, fifth, seventh, etc. harmonic components and that the voltage between reactors 43 and 44, respectively, and 44 and 45, respectively, is distorted, if measured at their terminals closest to reactors 4, 5, and 6.

The condensers 52, 53, 54 carry fundamental and all odd harmonic components of the supply voltage in this form of invention; and thus such compacitors are filling a two-fold role; namely, acting as series capacitors to the load at triplen harmonic frequencies and acting as shunt capacitors for all other odd numbered frequencies, including the fundamental.

It will be obvious to anyone skilled in the art to which this invention pertains that any other capacitors connected in star or delta between the reactors 43 and 4, respectively, 44 and 5, respectively, 45 and 6, respectively, will not carry tripler harmonic currents unless their artificial neutral is connected into the load circuit. For example, capacitors 52, 53, 54, could be split into two groups, one carrying and one not carrying triplen harmonics. The most difficult harmonic content to reduce are the fifth and seventh harmonic content of the line current; reduction can be achieved by using linear reactors 43, 44, 45, together with capacitors 52, 53, 54; in such instance the linear reactors 43, 44, 45, act to block the harmonic currents and hence more shunted through the capacitors 52, 53, and 54.

If reactors 49, 50, 51 are employed which are tuned to fifth or seventh harmonic series resonance or in between the two resonance points with respect to capacitors 52, 53, and 54, improvement in the input power factor is achieved.

Similar improvement may be achieved if the capacitors 46, 47, 48 are tuned into parallel resonance at the fifth and seventh harmonic frequency with reactors 43, 44, 45.

A reactor 61 with capacitors 62 may be disposed between the load 56 and the common point 55.

Various variations of these methods are possible; as will be understood, it is however the intent of the invention that very close to unity power factor is achieved at the supply terminals 1, 2, 3, and a negligible amount of harmonic current is reflected into the line.

Figure 4:
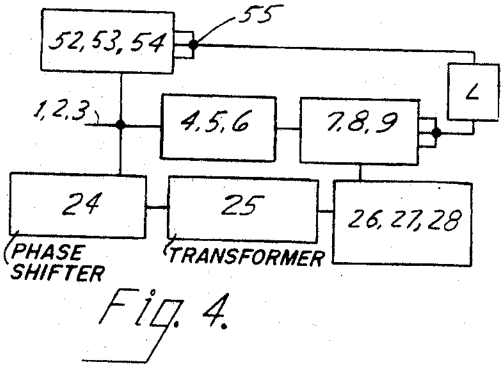
FIGURE 4 is a block diagram of a frequency tripler according to the invention.

FIGURE 4, it will be noted, is block diagram of a tripler showing components previously herein referred to; namely, the supply terminals 1, 2, 3; the phase shifter 24; reactors 4, 5, 6; capacitors 52, 53, 54; transformer 25; silicon controlled rectifiers 7, 8, 9; pulse circuits 26, 27, 28; and load L.

Figure 5:
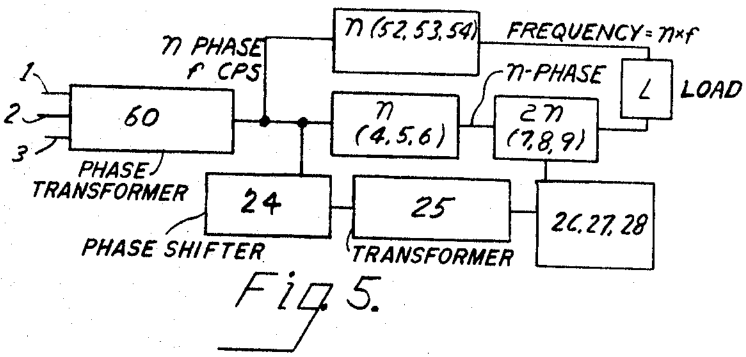
FIGURE 5 is a block diagram of a frequency multiplier of a further modification of the invention.

In FIGURE 5 is shown the block diagram of a frequency multiplier to harness the Nth harmonic power of the supply frequency. The circuit shown shows a phase splitting transformer 60, the capacitors, reactors, silicon controlled rectifiers, the phase shifter, which form circuits as shown in FIGURE 4. It is to be noted that in this circuit all the disclosures of power factor compensation means described are employed; as illustrated. It should be noted that there are no linear reactors disposed inbetween the three-phase supply 101, 102, 103 and the silicon controlled rectifiers. It is assumed here however that capacitors 52, 53, 54 and their associated reactors 49, 50, 51, as shown in FIGURE 3 may be connected across supply lines 101, 102, 103 and their common point 55 to the load 12 in such a way that close to unity power factor is achieved at the input terminals. The current here as in all other circuits shown is load commutated. When reactors 4, 5, 6 are not in the line the gating circuit must be designed so as to avoid crossfiring of the silicon controlled rectifiers. This can be achieved in many known ways. Best performance is obtained under these conditions when the firing angle is such that the current pulses are centered below the voltage wave in each phase. A multiphase output can be produced by using two identical circuits as shown in FIGURE 4 and by supplying one of them through a phase shifting transformer that creates a 30° phase shift on the supply side. On the output side two 180 c.p.s. voltages are obtained with a 90° phase shift. These can be fed through a Scott-connected transformer to obtain a three phase output or the two voltages could be used as a two phase system.

The invention, as is readily apparent, may be employed not only as a tripler as illustrated but as a multiplier for changing any multi-phase frequency to any desired single or multi-phase frequency and can be employed as a phase balancer as will be understood by those skilled in the art to which the invention pertains.

Figure 6:
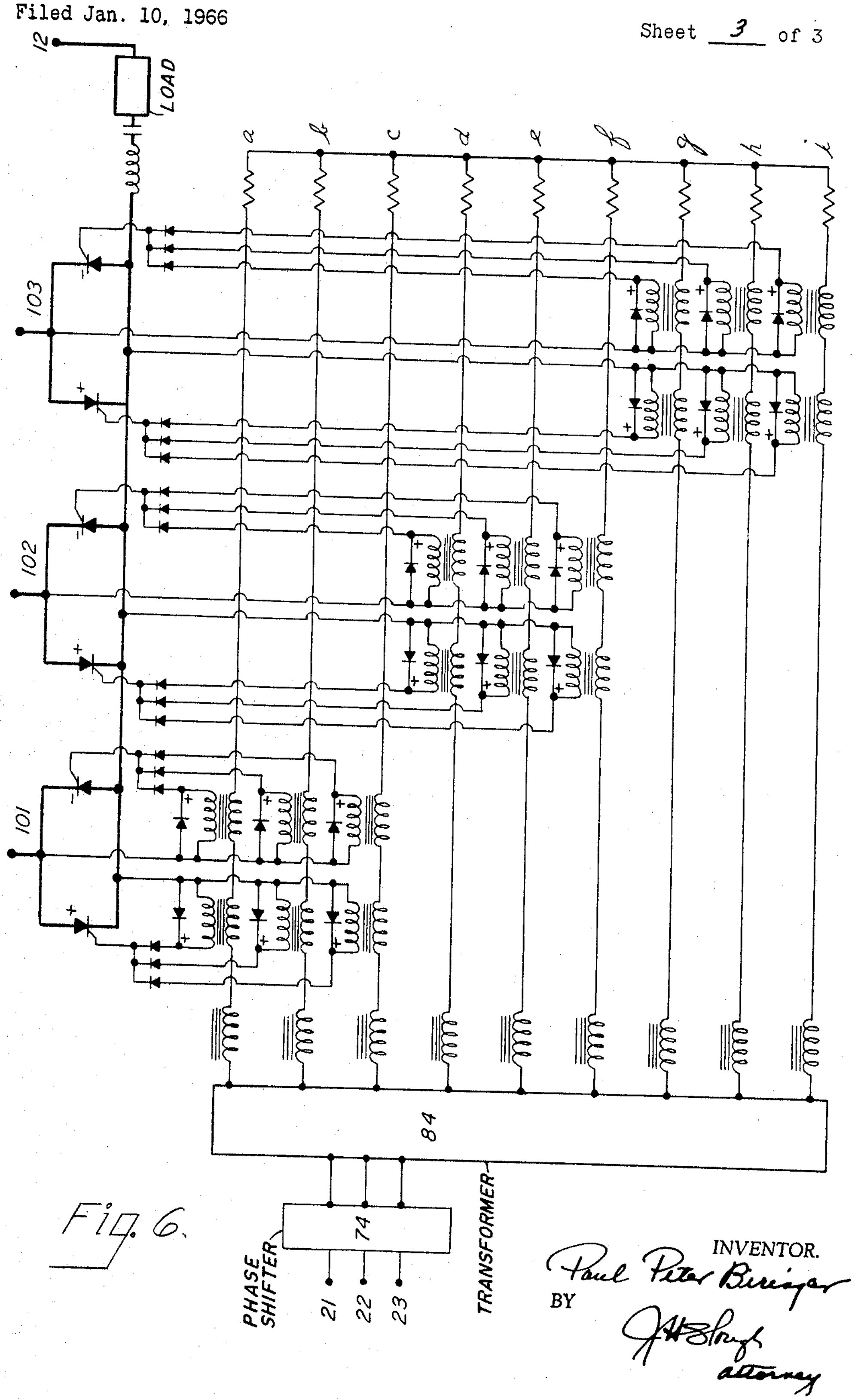
FIGURE 6 is a circuit diagram of a three phase input circuit and firing circuit, the frequency output being the source frequency multiplied by nine.

FIGURE 6 is illustrative of a case where three phase input yields a single phase output of 540 c.p.s. In this form a 60 c.p.s. phase shifter 74 similar to phase shifter 24 of FIGURE 2 is shown, a phase splitting transformer 84 is disposed in the three phase input circuit; input circuits and firing and pulsing circuits similar to those used in the three input phase circuit of FIGURES 1 and 2 are shown in FIGURE 6.

Figure 7:
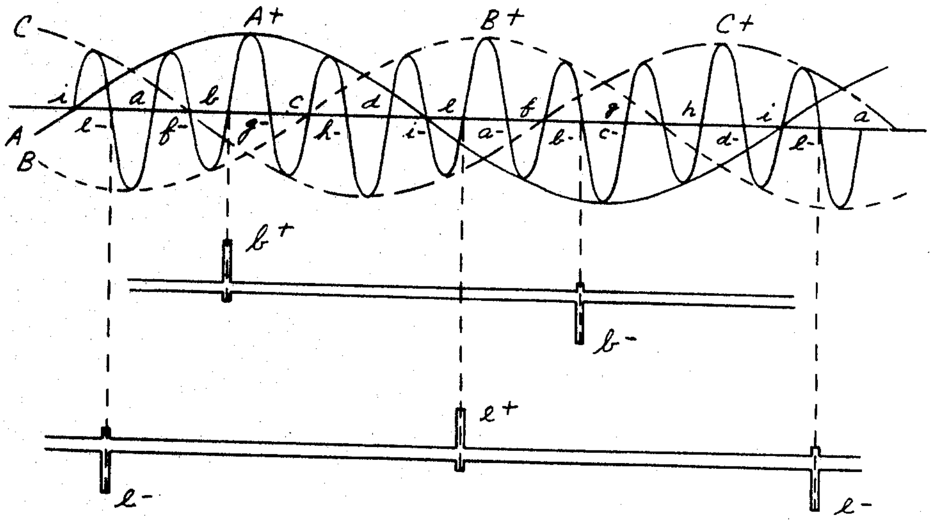
FIGURE 7 is a diagrammatic view of the output and input waves showing the voltage wave forms in the circuit and different firing pulses.

FIGURE 7 is a diagrammatic view illustrating the three phase input A, B, C, and single phase output i.e. showing the relative timing of the input, output and signal voltages, only 4 of the 18 signal pulses of the system of FIGURE 6 being shown.

Figure 8:
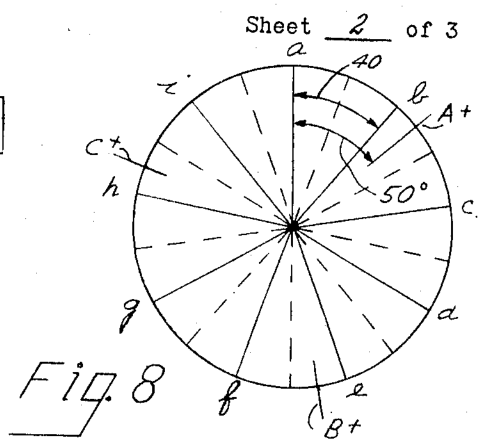
FIGURE 8 is a view showing the firing sequence related to the wave forms of FIGURE 7.

FIGURE 8 is a diagrammatic view of the firing sequence.

It will be noted that in all forms of the invention, a linear symmetrical circuit is disclosed with the exception of the solid state switching devices or SCR's which are non-linear. However, such non-linear switching elements are controllable and the angle of firing the same can be set or changed to any angle and without limit by using suitable firing circuit. The output power is limited by the linear reactors unless the load circuit is capacitive as shown in FIGURE 1B. The current is commutated by all capacitors and reactors in its path at the desired output frequency.

It is to be noted that in one form of the invention the linear reactors are disposed in series in each line of a three phase system to limit the current and to shunt secondary current.

In one mode of operation, during some part of the cycle, two silicon controlled rectifiers are conducting simultaneously; the line current is limited by two linear reactors in series across the line-to-line supply voltage and the tripler harmonics are limited by three linear reactors in parallel and by the load. It is to be noted that the operation of the firing is such that it may be a so-called locked firing angle; for example, the firing angle may be set. By changing the firing angle of the synchronous multiplier of this invention so that the current pulses are starting before or after the 60° firing angle point the input power factor will be capacitive or inductive. Thus the changing or the firing angle will have the same effect on the synchronous converter of this invention as the field current changes on synchronous motors or generators. In fact, the input power factor of a loaded synchronous converter could be (resistive) unity, or capacitive or inductive as a function of the setting of the firing angle.

It is to be noted that compared with magnetic frequency multipliers, the silicon controlled rectifiers add a substantial degree of freedom, since the firing angle thereof can be controlled.

While the invention has been disclosed in connection with preferred embodiments herein, it is obvious that numerous and extensive departures may be made therefrom, without, however, departing from the spirit of the invention or the scope of the appended claims.

What is claimed is:

1. For a multiphase source of alternating current for converting multiphase power to a different number of phases, an input circuit comprising a reactance in series in each phase of the input circuit, dual directional control switching means for each phase of the supply, the operation of said switching means being independent of the supply voltage, said dual directional control switching means being operated selectively in one direction in the positive half cycle of power supply and in the opposite direction in the negative half cycle of power supply, the dual directional control switching means being operated at selected times, frequency output means comprising a common connection for said dual directional control switching means and a neutral point in the supply circuit.

2. For a multiphase source of alternating current for converting three phase power of one frequency to single phase power of a high frequency, an input circuit comprising a reactance in series in each phase of the input circuit line, dual directional control switching means for each phase of the supply, the operation of said switching means being independent of the supply voltage, said dual directional control switching means being operated selectively in one direction in the positive half cycle of power supply and in the opposite direction in the negative half cycle of power supply, the dual directional control switching means being operated at selected times, frequency output means comprising a common connection for said dual directional control switching means and a neutral point in the supply circuit.

3. For a multiphase source of alternating current for converting three phase power of one frequency to single phase power of a higher frequency, an input circuit comprising a reactance in series in each phase of the input circuit line, a pair of solid state conductor switching devices for each phase of the supply, the operation of said switching means being independent of the supply voltage, said solid state switching devices being fired selectively, one of each pair in one direction in the positive half cycle and the other in the opposite direction in the negative half cycle of power supply, each of the solid state switching devices being fired at a different selected time, high frequency output means comprising a common connection for said solid state switching devices and a neutral point in the supply circuit.

4. For a multiphase source of alternating current for converting three phase power of one frequency to single phase power of a higher frequency, an input circuit comprising a reactance in series in each phase of the input circuit line, a pair of silicon controlled rectifiers in opposed parallel relationship for each phase of the supply, the operation of said rectifiers being independent of the supply voltage, said silicon controlled rectifiers being fired selectively, one of each pair in one direction in the positive half cycle and the other in the opposite direction in the negative half cycle of power supply, each of the silicon controlled rectifiers being fired at a different selected time, high frequency output means comprising a common connection for said silicon controlled rectifiers and a neutral point in the supply circuit.

5. For a multiphase source of alternating current for converting three phase power of one frequency to single phase power of a higher frequency, an input circuit comprising capacitance connected line-to-line across the input phases having a common point, a reactance in series in each phase of the input circuit line, a pair of silicon controlled rectifiers back-to-back for each phase of the supply, the operation of said rectifiers being independent of the supply voltage, said silicon controlled rectifiers being fired selectively, one of each pair in one direction in the positive half cycle and the other in the opposite direction in the negative half cycle of power supply, each of the silicon controlled rectifiers being fired at a different selected time, high frequency output means comprising a common connection for said silicon controlled rectifiers and a common point of said capacitance.

6. For a multiphase source of alternating current for converting three phase power of one frequency to single phase power of a higher frequency, an input circuit comprising a reactance in series in each phase of the input circuit line, a pair of silicon controlled rectifiers back-to-back for each phase of the supply, the operation of said rectifiers being independent of the supply voltage, said silicon controlled rectifiers being fired selectively, one of each pair in one direction in the positive half cycle and the other in the opposite direction in the negative half cycle of power supply, each of the silicon controlled rectifiers being fired at a different selected time, the current conduction points of said silicon controlled rectifiers overlapping high frequency output means comprising a common connection for said silicon controlled rectifiers and a neutral point in the supply circuit.

7. For a multiphase source of alternating current for converting three phase power of one frequency to single phase power of a higher frequency, an input circuit comprising a reactance in series in each phase of the input circuit line, a pair of silicon controlled rectifiers back-to-back for each phase of the supply, the operation of said rectifiers being independent of the supply voltage, said silicon controlled rectifiers being fired selectively, one of each pair in one direction in the positive half cycle and the other in the opposite direction in the negative half cycle of power supply, each of the silicon controlled rectifiers being fired at a different selected time, the current conduction points of said silicon controlled rectifiers being separate, high frequency output means comprising a common connection for said silicon controlled rectifiers and a neutral point in the supply circuit.

8. For a multiphase source of alternating current for converting three phase power of one frequency to single phase power of a higher frequency, an input circuit comprising capacitance connected line-to-line in delta or wye arrangement to supply fundamental frequency capacitance current to the lines for power factor compensation, a pair of silicon controlled rectifiers back-to-back for each phase of the supply, the operation of said rectifiers being independent of the supply voltage, said silicon controlled rectifiers being fired selectively, one of each pair in one direction in the positive half cycle and the other in the opposite direction in the negative half cycle of power supply, each of said silicon controlled rectifiers being fired at a different selected time, high frequency output means comprising a common connection for said silicon controlled rectifiers and a neutral point in the supply circuit.

9. For a multiphase source of alternating current for converting three phase power of one frequency to single phase power of a higher frequency, an input circuit comprising capacitance connected line-to-line in delta or wye arrangement to supply fundamental frequency capacitance current to the lines for power factor compensation, a pair of silicon controlled rectifiers back-to-back for each phase of the supply, the operation of said rectifiers being independent of the supply voltage, said silicon controlled rectifiers being fired selectively, one of each pair in one direction in the positive half cycle and the other in the opposite direction in the negative half cycle of power supply, each of the silicon controlled rectifiers being fired at a different selected time, high frequency output means comprising a common connection for said silicon controlled rectifiers and a common point for the capacitance.

10. For a multiphase source of alternating current for converting three phase power of one frequency to single phase power of a higher frequency, an input circuit comprising capacitance connected line-to-line in delta or wye arrangement to supply fundamental frequency capacitance current to the lines for power factor compensation, a pair of silicon controlled rectifiers back-to-back for each phase of the supply, the operation of said rectifiers being independent of the supply voltage, said silicon controlled rectifiers being fired selectively, one of each pair in one direction in the positive half cycle and the other in the opposite direction in the negative half cycle of power supply, each of the said silicon controlled rectifiers being fired at a different selected time, high frequency output means comprising a common connection for said silicon controlled rectifiers and a neutral point in the supply circuit, and synchronously at desired time intervals and sequency.

11. For a multiphase source of alternating current for converting three phase power of one frequency to single phase power of a higher frequency, an input circuit comprising capacitance connected line-to-line in delta or wye arrangement to supply fundamental frequency capacitance current to the lines for power factor compensation, a pair of silicon controlled rectifiers back-to-back for each phase of the supply, the operation of said rectifiers being independent of the supply voltage, said silicon controlled rectifiers being fired selectively, one of each pair in one direction in the positive half cycle and the other in the opposite direction in the negative half cycle of power supply, each of the silicon controlled rectifiers being fired at a different selected time, high frequency output means comprising a common connection for said silicon controlled rectifiers and a common point for the capacitance, and synchronous control signals to operate the switching means synchronously at desired time intervals and sequence.

12. For a multiphase source of alternating current for converting three phase power of one frequency to single phase power of a higher frequency, an input circuit comprising capacitors connected across the line in star connections, each of said capacitors having a series reactor tuned to the undesired harmonic components of the line current and the series combination of capacitors and reactors having a common point to which the load circuit is connected, a pair of silicon controlled rectifiers back-to-back for each phase of the supply, the operation of said rectifiers being independent of the supply voltage, said silicon controlled rectifiers being fired selectively, one of each pair in one direction in the negative half cycle of power supply, each of the silicon controlled rectifiers being fired at a different selected time, high frequency output means comprising a common connection for said silicon controlled rectifiers and a common point for the capacitance, and synchronous signals to operate the switching means synchronously at desired time intervals and sequence, so as to yield close to unity power factor at the supply terminals.

13. For a multiphase source of alternating current for converting three phase power of one frequency to single phase power of a higher frequency as claimed in claim 12, wherein crossfiring of the switching means is prevented by tuning of the load circuit.

14. For a multiphase source of alternating current for converting three phase power of one frequency to single phase power of a higher frequency as claimed in claim 12, wherein crossfiring of the switching means is prevented by controlling the occurence of gating pulses.

15. For a multiphase source of alternating current for converting three phase power of one frequency to single phase power of a higher frequency as claimed in claim 12, wherein the current pulse is centered below the voltage wave form in each phase to achieve high input power factor.

References Cited

UNITED STATES PATENTS

| | | | |
|---|---|---|---|
| 3,152,297 | 10/1964 | Peaslee | 321—61 |
| 3,287,622 | 11/1966 | Eckenfelder et al. | 321—69 |
| 3,368,136 | 2/1968 | Krabbe | 321—7 |
| 2,431,083 | 11/1947 | Sciaky | 321—7 |
| 3,040,230 | 6/1962 | Biringer | 321—7 |
| 3,270,270 | 8/1966 | Yenisey | 321—18 |
| 3,295,045 | 12/1966 | Domizi | 321—7 |

JOHN F. COUCH, *Primary Examiner.*

G. GOLDBERG, *Assistant Examiner.*

U.S. Cl. X.R.

307—242, 271; 321—58, 69

U.S. DEPARTMENT OF COMMERCE

PATENT OFFICE

Washington, D.C. 20231

UNITED STATES PATENT OFFICE

CERTIFICATE OF CORRECTION

Patent No. 3,436,641 April 1, 1969

Paul Peter Biringer

It is certified that error appears in the above identified patent and that said Letters Patent are hereby corrected as shown below:

Column 1, line 36, "2,040,230" should read -- 3,040,230 --.

Signed and sealed this 14th day of April 1970.

(SEAL)
Attest:

Edward M. Fletcher, Jr.
Attesting Officer

WILLIAM E. SCHUYLER, JI
Commissioner of Patents